US007663100B2

(12) United States Patent
Vestal

(10) Patent No.: US 7,663,100 B2

(45) Date of Patent: Feb. 16, 2010

(54) REVERSED GEOMETRY MALDI TOF

(75) Inventor: Marvin L. Vestal, Framinghan, MA (US)

(73) Assignee: Virgin Instruments Corporation, Sudbury, MA (US)

(*) Notice: Subject to any disclaimer, the term of this patent is extended or adjusted under 35 U.S.C. 154(b) by 518 days.

(21) Appl. No.: 11/742,693

(22) Filed: May 1, 2007

(65) Prior Publication Data

US 2008/0272293 A1 Nov. 6, 2008

(51) Int. Cl.
*B01D 59/44* (2006.01)
*H01J 49/00* (2006.01)

(52) U.S. Cl. ....................... 250/287; 250/281; 250/282; 250/286

(58) Field of Classification Search ................. 250/287, 250/281, 282, 286
See application file for complete search history.

(56) References Cited

U.S. PATENT DOCUMENTS 4,730,111 A 3/1988 Vestal et al.
4,731,533 A 3/1988 Vestal
4,766,312 A 8/1988 Fergusson et al.
4,814,612 A 3/1989 Vestal et al.
4,861,989 A 8/1989 Vestal et al.
4,883,958 A 11/1989 Vestal
4,902,891 A 2/1990 Vestal
4,958,529 A 9/1990 Vestal
4,960,992 A 10/1990 Vestal et al.
5,015,845 A 5/1991 Allen et al.
5,160,840 A 11/1992 Vestal
5,202,563 A * 4/1993 Cotter et al. ................ 250/287
5,464,985 A * 11/1995 Cornish et al. .......... 250/396 R
5,498,545 A 3/1996 Vestal
5,625,184 A 4/1997 Vestal et al.
5,627,369 A 5/1997 Vestal et al.
5,760,393 A 6/1998 Vestal et al.
6,002,127 A 12/1999 Vestal et al.
6,013,913 A * 1/2000 Hanson ...................... 250/287
6,057,543 A 5/2000 Vestal et al.

(Continued)

FOREIGN PATENT DOCUMENTS

GB 2 370 114 6/2002

(Continued)

OTHER PUBLICATIONS

R. Kaufmann, et al., "Sequencing of Peptides in a Time-of-Flight Mass Spectrometer-Evaluation of Postsource Decay . . . ," Int. J. Mass Spectrom. Ion Process. 131: 355-385 (1994).

(Continued)

*Primary Examiner*—Nikita Wells
*Assistant Examiner*—Johnnie L Smith
(74) *Attorney, Agent, or Firm*—Kurt Rauschenbach; Rauschenbach Patent Law Group, LLC

(57) ABSTRACT

The TOF mass spectrometer disclosed places an even number of ion mirrors in close proximity to a MALDI ion source and a field-free drift space between the exit from the mirrors and an ion detector. This "reversed geometry" configuration may be distinguished from a conventional reflecting TOF analyzer employing a single ion mirror where a large fraction of the total drift space is located between the ion source and the mirror.

22 Claims, 8 Drawing Sheets

U.S. PATENT DOCUMENTS

| | | | |
|---|---|---|---|
| 6,175,112 | B1 | 1/2001 | Karger et al. |
| 6,281,493 | B1 | 8/2001 | Vestal et al. |
| RE37,485 | E | 12/2001 | Vestal |
| 6,348,688 | B1 | 2/2002 | Vestal |
| 6,414,306 | B1 | 7/2002 | Mayer-Posner et al. |
| 6,441,369 | B1 | 8/2002 | Vestal et al. |
| 6,504,150 | B1 | 1/2003 | Verentchikov et al. |
| 6,512,225 | B2 | 1/2003 | Vestal et al. |
| 6,534,764 | B1 | 3/2003 | Verentchikov et al. |
| 6,541,765 | B1 | 4/2003 | Vestal |
| 6,621,074 | B1 | 9/2003 | Vestal |
| 6,670,609 | B2 | 12/2003 | Franzen et al. |
| 6,674,070 | B2 | 1/2004 | Karger et al. |
| 6,770,870 | B2 | 8/2004 | Vestal |
| 6,825,463 | B2 | 11/2004 | Karger et al. |
| 6,831,270 | B2 | 12/2004 | Furuta et al. |
| 6,844,545 | B1 | 1/2005 | Hutchins et al. |
| 6,900,061 | B2 | 5/2005 | Smirnov et al. |
| 6,918,309 | B2 | 7/2005 | Brock et al. |
| 6,933,497 | B2 | 8/2005 | Vestal |
| 6,952,011 | B2 | 10/2005 | Brown et al. |
| 6,953,928 | B2 | 10/2005 | Vestal et al. |
| 6,995,363 | B2 | 2/2006 | Donegan et al. |
| 7,030,373 | B2 | 4/2006 | Vestal et al. |
| 7,064,319 | B2 | 6/2006 | Hashimoto et al. |
| 7,109,480 | B2 | 9/2006 | Vestal et al. |
| RE39,353 | E | 10/2006 | Vestal |
| 7,176,454 | B2 | 2/2007 | Hayden et al. |
| 7,589,319 | B2 * | 9/2009 | Vestal ........................ 250/287 |
| 2002/0145109 | A1 * | 10/2002 | Doroshenko ................ 250/287 |
| 2003/0057368 | A1 | 3/2003 | Franzen et al. |
| 2003/0116707 | A1 | 6/2003 | Brown et al. |
| 2003/0141447 | A1 * | 7/2003 | Verentchikov et al. ...... 250/287 |
| 2005/0031496 | A1 | 2/2005 | Laurell et al. |
| 2005/0087685 | A1 | 4/2005 | Bouvier et al. |
| 2005/0130222 | A1 | 6/2005 | Lee et al. |
| 2005/0178959 | A1 | 8/2005 | Lopez-Avila et al. |
| 2005/0269505 | A1 * | 12/2005 | Ermer ........................ 250/287 |
| 2006/0266941 | A1 | 11/2006 | Vestal |
| 2006/0273252 | A1 | 12/2006 | Hayden et al. |
| 2007/0038387 | A1 | 2/2007 | Chen et al. |
| 2007/0054416 | A1 | 3/2007 | Regnier et al. |
| 2008/0272290 | A1 * | 11/2008 | Vestal ........................ 250/287 |
| 2008/0272291 | A1 * | 11/2008 | Vestal ........................ 250/287 |
| 2009/0026365 | A1 * | 1/2009 | Satoh ........................ 250/287 |

FOREIGN PATENT DOCUMENTS

| | | | |
|---|---|---|---|
| WO | WO 2004/018102 | A1 | 3/2004 |
| WO | WO 2005/061111 | A2 | 7/2005 |

OTHER PUBLICATIONS

J. Preisler, et al., "Capillary Array Electrophoresis-MALDI Mass Spectrometry using a Vacuum Deposition Interface," Anal. Chem. 74: 17-25 (2002).

R. L. Caldwell and R. M. Caprioli, "Tissue Profiling by Mass Spectrometry," MCP 4: 394-401 (2005).

M. L. Vestal, et al., "Delayed Extraction Matrix-Assisted Laser Desorption Time-of-Flight Mass Spectrometry," Rapid Comm. Mass Spectrom. 9: 1044-1050 (1995).

M. L. Vestal and P. Juhasz, "Resolution and Mass Accuracy in Matrix-Assisted Laser Desorption Time-of-Flight Mass Spectrometry," J. Am. Soc. Mass Spectrom. 9: 892-911 (1998).

E. J. Takach, et al., "Accurate Mass Measurement using MALDI-TOF with Delayed Extraction," J. Prot. Chem. 16: 363-369 (1997).

D. J. Beussman, et al., "Tandem Reflectron Time-of-Flight Mass Spectrometer Utilizing Photodissociation," Anal. Chem. 67: 3952-3957 (1995).

M. L. Vestal, "High-Performance Liquid Chromatography-Mass Spectrometry," Science 226: 275-281 (1984).

* cited by examiner

REVERSED GEOMETRY MALDI TOF

BACKGROUND OF THE INVENTION

Matrix assisted laser desorption/ionization time-of-fight mass (MALDI-TOF) spectrometry is an established technique for analyzing a variety of nonvolatile molecules including proteins, peptides, oligonucleotides, lipids, glycans, and other molecules of biological importance. While this technology has been applied to many applications, widespread acceptance has been limited by many factors including cost and complexity of the instruments, relatively poor reliability, and insufficient performance in terms of speed, sensitivity, resolution, and mass accuracy.

In the art, different types of TOF analyzers are required depending on the properties of the molecules to be analyzed. For example, a simple linear analyzer is preferred for analyzing high mass ions such as intact proteins, oligonucleotides, and large glycans, while a reflecting analyzer is required to achieve sufficient resolving power and mass accuracy for analyzing peptides and small molecules. Determination of molecular structure by MS-MS techniques requires yet another analyzer. In some commercial instruments all of these types of analyzers are combined in a single instrument. This has the benefit of reducing the cost somewhat relative to three separate instruments, but the downside is a substantial increase in complexity, reduction in reliability, and compromises are required that make the performance of all of the analyzers less than optimal.

Many areas of science require accurate determination of the molecular masses and relative intensities of a variety of molecules in complex mixtures and while many types of mass spectrometers are known in the art, each has well-known advantages and disadvantages for particular types of measurements. Time-of-flight (TOF) with reflecting analyzers provides excellent resolving power, mass accuracy, and sensitivity at lower masses (up to 5-10 kda), but performance is poor at higher masses primarily because of substantial fragmentation of ions in flight. At higher masses, simple linear TOF analyzers provide satisfactory sensitivity, but resolving power is limited. An important advantage of TOF MS is that essentially all of the ions produced are detected, unlike scanning MS instruments.

Applications such as tissue imaging and biomarker discovery require measurements on intact proteins over a very broad mass range. For these applications, mass range, sensitivity over a broad mass range, speed of analysis, reliability, and ease-of-use are more important than resolving power. The present invention seeks to address these issues in providing a mass spectrometer having optimum performance that is reliable, easy to use, and relatively inexpensive.

SUMMARY OF THE INVENTION

The TOF mass spectrometer according to the present invention places an even number of ion mirrors in close proximity to a MALDI ion source, and a field-free drift space between the exit from the mirrors and an ion detector. This "reversed geometry" configuration may be distinguished from a conventional reflecting TOF analyzer employing a single ion mirror where a large fraction of the total drift space is located between the ion source and the mirror. In these prior art analyzers, ions fragmenting in the ion source, the field-free space between the ion source and the entrance to the mirror, and in the mirror arrive at the detector at a time less than the arrival time of their precursor. The ions not only are lost from the precursor peak but also contribute noise that may interfere with measurements of other species present. Ions fragmenting in the field-free region between the exit from the mirror and the detector are recorded at substantially the same time as their precursor ion. Thus they contribute to the useful signal and do not contribute to noise. In the mass analyzer according to the present invention, a majority of the total flight path is located in the region between mirror exit and detector where fragment ions contribute to signal and do not contribute to noise. Furthermore, ions fragmenting in the region including the ion source and the mirror are substantially prevented from reaching the detector. Thus, while these ions do not contribute to signal they also do not contribute to noise. The analyzer according to the present invention therefore provides resolving power comparable to a conventional reflector of similar dimensions, but sensitivity for high-mass and other fragile ions that is intermediate between that of the linear analyzer and the reflecting analyzer. Even though the absolute sensitivity in terms of ions detected per molecule sampled may be somewhat less in the analyzer according to the present invention relative to that of a linear analyzer, the effective sensitivity in terms of the ability to detect trace components is substantially improved in many cases since the enhanced resolving power places the ions in a narrower peak allowing adjacent trace components to be detected.

The mass spectrometer according to the invention comprises a MALDI sample plate and pulsed ion source located in a source vacuum housing; an analyzer vacuum housing isolated from the source vacuum housing by a gate valve containing an aperture and maintained at ground potential; a vacuum generator that maintains high vacuum in the analyzer; a pulsed laser beam that enters the source housing through the aperture in the gate valve when the valve is open and strikes the surface of a sample plate within the source producing ions that enter the analyzer through the aperture; an ion accelerator that further accelerates the ions; a pair of two-stage ion mirrors in close proximity to the ion accelerator; a field-free drift space at the potential supplied by the accelerator; an ion detector at the opposite end of the drift space from the gate valve; and high voltage supplies for supplying electrical potentials to the ion accelerator and the ion mirrors. One embodiment further comprises an ion lens in close proximity to the ion source and aligned with the ion beam passing through the aperture in the gate valve. One embodiment further comprises ion deflectors in close proximity to the ion lens for deflecting the ions to reach the detector. At least one of the deflector electrodes is energized by a time dependent voltage that causes ions in one or more selected mass ranges to be deflected away from the detector. One embodiment further comprises an ion lens between the pair of mirrors. In one embodiment an ion lens is located in close proximity to the exit of the ion mirrors.

In one embodiment the length of the field-free region, the lengths of each of the stages of the mirrors, and the voltages applied to the mirrors are chosen to provide both first and second order velocity focusing from the source focus to the detector. In one method according to the invention the ion source operating conditions are chosen to give the optimum resolving power possible for a given set of initial conditions, ion energy, and overall size of the analyzer.

A high voltage pulse generator supplies a voltage pulse to the MALDI sample plate, and the time between the voltage pulse and the time that ions are detected at the detector is recorded by the digitizer to produce a time-of-flight spectrum that may be interpreted as a mass spectrum by techniques well known in the art.

An object of the invention is to provide the optimum practical performance within limitations imposed by the length of the analyzer, the accelerating voltage, and the initial conditions including the width of the initial velocity distribution of the ions produced by MALDI and the uncertainty in initial position due, for example, to the size of the matrix crystals. In TOF mass spectrometry the performance can generally be improved by increasing the length of the analyzer and, for higher masses, by increasing the accelerating voltage, but these tend to increase the cost and reduce the reliability. The initial conditions are determined by the ionization process and are independent of the TOF analyzer design. In one embodiment of the invention the accelerating voltage is 20 kilovolts, and the effective length of the analyzer is 2100 mm.

In one embodiment deflector electrodes are provided in a field-free region adjacent to the extraction electrode and energized to deflect ions in either of two orthogonal directions. At least one of the deflector electrodes may be energized by a time dependent voltage that causes ions in one or more selected mass ranges to be deflected away from the detector.

In one embodiment, the present invention provides a time-of-flight mass spectrometer which comprises a pulsed ion source; a first field-free drift space positioned to receive ions from the pulsed ion source; a first ion mirror which receives ions from the first field-free drift space, wherein the longitudinal axis of said first ion mirror is inclined at a predetermined angle relative to the longitudinal axis of the first field-free drift; a second ion mirror which receives ions reflected by said first ion mirror, said second ion mirror having a longitudinal axis substantially parallel to the longitudinal axis of the first ion; a second field-free drift space positioned to receive ions reflected by the second ion mirror; and an ion detector having an input surface in electrical contact with the second field field-free drift space at the end distal from the second ion mirror. In one embodiment, the longitudinal axis of the second field-free drift space may be substantially parallel to the longitudinal axis of the first field-free drift space.

Alternatively the longitudinal axis of the second field-free drift space may be displaced latterly from the longitudinal axis of the first field-free drift space and the longitudinal axis of the second ion mirror may be displaced latterly in the same direction from the longitudinal axis of the first ion mirror. In one embodiment, displacement between the longitudinal axes of the field-free spaces is greater than the displacement between the longitudinal axes of the ion mirrors, but not more than twice as great.

According to the present invention, the first and second ion mirrors may be of the same type, substantially identical, or vary in optical properties or configuration. It is preferred that the mirrors be substantially identical. It is further preferred that each of said first and said second ion mirrors are two-stage ion mirrors. Each of the two-stage ion mirrors may comprise two substantially uniform fields and wherein the field boundaries are defined by grids that are substantially parallel. In one embodiment, each of the two-stage ion mirrors comprises two substantially uniform fields and wherein the field boundaries are defined by substantially parallel conducting diaphragms with small apertures, said apertures aligned with incident and reflected ion beams.

In one embodiment, the electrical field strength in the first stage of the two-stage ion mirrors adjacent to a field-free drift space is greater than the electrical field strength in the second stage of the two-stage ion mirrors.

In one embodiment, the electrical field strength in the first stage of the two-stage ion mirrors adjacent to the field-free drift space is at least twice but not more than four times greater than the electrical field strength in the second stage of the two-stage ion mirrors.

In one embodiment of the invention, the length of the second field-free drift space of the time-of-flight mass spectrometer is more than three times the length of the first field-free drift space.

In one embodiment, the present invention provides a time-of-flight mass spectrometer wherein more than half of the total ion flight time between the pulsed ion source and the ion detector occurs in the second field-free drift space.

The present invention further provides a time-of-flight mass spectrometer comprising an ion source vacuum housing configured to receive a MALDI sample plate; a pulsed ion source located within the evacuation ion source housing; an analyzer vacuum housing; a gate valve located between and operably connecting said ion source vacuum housing and said analyzer vacuum housing and maintained at or near ground potential; a first field-free drift tube located within said analyzer vacuum housing but electrically isolated from said housing to receive an ion beam from said pulsed ion source; a first two-stage gridless ion mirror to receive ions from said first field-free drift tube; a second two-stage gridless ion mirror to receive ions from said first ion mirror; a second field-free drift tube located within said analyzer vacuum housing but electrically isolated from said housing to receive an ion beam from said second two-stage gridless ion mirror; and an ion detector having an input surface in electrical contact with the second field field-free drift tube at the end distal from the second two-stage gridless ion mirror. In this embodiment, the spectrometer may further comprise an aperture in the back of the first ion mirror substantially aligned with an aperture in the gate valve; and a pulsed laser laser beam directed through the apertures in (h) to strike the MALDI sample plate and produce a pulse of ions. Additionally the spectrometer may comprise a high voltage pulse generator operably connected to the MALDI sample plate within the source vacuum housing; a time delay generator providing a predetermined time delay between an ion pulse and a high voltage pulse; a first high voltage supply providing substantially constant voltage to the first and second field-free drift tubes of opposite polarity to that of the high voltage pulse generator; a second high voltage supply providing substantially constant voltage to an electrode separating the first and second stages of the two-stage ion mirrors wherein the same voltage is applied to both mirrors; and a third high voltage supply providing substantially constant voltage to an electrode terminating the second stage of the two-stage ion mirrors wherein the same voltage is applied to both mirrors and the magnitude of this voltage is of the same polarity and greater in magnitude by a predetermined amount relative to the amplitude of the high voltage pulse referenced to ground potential.

In one embodiment, the predetermined time delay comprises an uncertainty of not more than 1 nanosecond.

The spectrometer of the present invention may further comprise one or more pairs of deflection electrodes located in a field-free region at ground potential adjacent to the gate valve with any pair energized to deflect ions in either of two orthogonal directions.

In one embodiment, at least one of the deflection electrodes of any pair of deflection electrodes is energized by a time-dependent voltage resulting in the deflection of ions in one or more selected mass ranges.

In one embodiment, the time-of-flight mass spectrometer of the present invention comprises one or more ion lenses for spatially focusing an ion beam. According to the present invention, these lenses comprise a first ion lens located between the pulsed ion source and the gate valve; a second ion lens located between the gate valve and the first field-free drift tube; a third ion lens located between the first and second two-stage gridless ion mirrors; and a fourth ion lens located in close proximity to the exit of the second two-stage gridless ion mirror; a first field-free drift tube located within said analyzer vacuum housing but electrically isolated from said housing to receive an ion beam from said pulsed ion source.

In one embodiment, the pulsed ion source of the time-of-flight mass spectrometer of the present invention operates at a frequency of 5 khz.

The present invention also provides methods for designing MALDI-TOF spectrometers.

Provided herein is a method for designing a MALDI-TOF mass spectrometer comprising the steps of determining or estimating the uncertainties in the initial velocity and position of the ions produced in the ion source; calculating values for the critical distance parameters defining the analyzer geometry; calculating the optimum time lag between laser pulse and high-voltage extraction pulse as a function of focus mass; calculating the optimum accelerating voltages and mirror voltages as functions of focus mass and calculating the theoretical resolving power as a function of m/z, wherein the results of the foregoing steps, taken together, provide the measurements of the MALDI-TOF mass spectrometer having predetermined limits on overall size and uncertainty in the time measurement.

In one embodiment is provided a method for designing a high-resolution MALDI-TOF mass spectrometer comprising the steps of calculating the minimum overall length and values for the critical distance parameters defining the analyzer geometry; calculating the optimum accelerating voltages and mirror voltages; and calculating the optimum time lag between laser pulse and high-voltage extraction pulse, wherein the results of the foregoing steps taken together provide the measurements for a high-resolution MALDI-TOF mass spectrometer capable of achieving a specified resolving power at a specified mass with specified values of the uncertainties in the initial velocity and position of ions produced in the ion source and the uncertainty in the time measurement.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
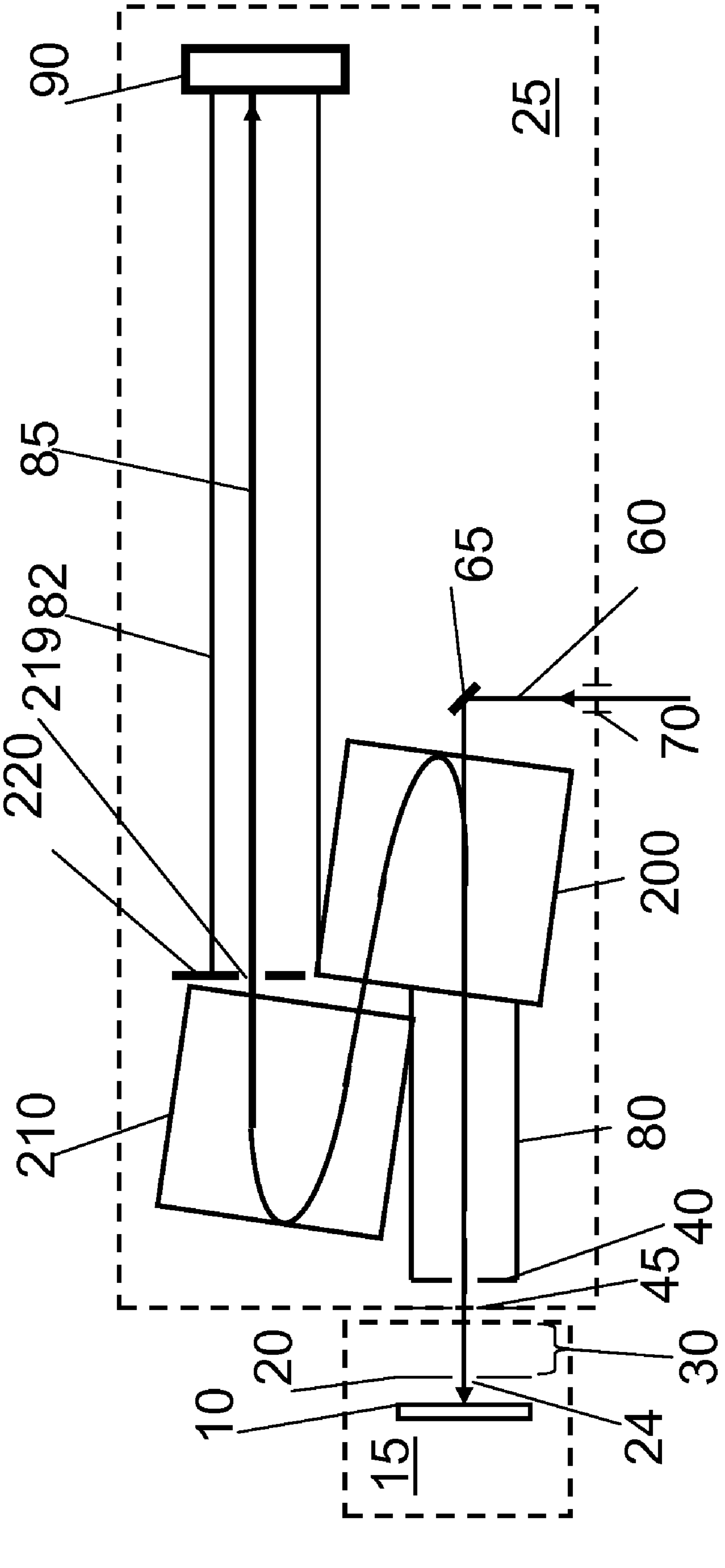
FIG. 1 is a schematic diagram of a reversed-geometry reflecting time-of-flight (TOF) mass spectrometer according to the invention.

A description of preferred embodiments of the invention follows. Referring now to FIG. 1, a schematic diagram of a reversed-geometry reflecting time-of-flight (TOF) mass spectrometer according to the invention is shown. A MALDI sample plate 10 with samples of interest in matrix crystals on the surface is installed within an evacuated ion source housing 15 and a spot or region on the plate containing the sample of interest is placed in the path of pulsed laser beam 60. As used herein, a "MALDI sample plate" or "sample plate" refers to the structure onto which the samples are deposited. Such sample plates are disclosed and described in copending U.S. application Ser. No. 11/541,467 filed Sep. 29, 2006, the entire disclosure of which is incorporated herein by reference. The laser beam passes through window 70 in the analyzer vacuum housing 25 and is directed toward the sample plate by mirror 65. At a predetermined time following the laser pulse, a high-voltage pulse is applied to the sample plate producing an electric field between sample plate and extraction electrode 20 at ground potential causing a pulse of ions to be accelerated. Timing of the high voltage pulse can be selected or determined using the equations described herein. The ions pass through the extraction electrode aperture 24 and through a first field-free region 30 and gate valve 45 (having an aperture 46; shown in FIG. 3) in the open position, and into analyzer vacuum housing 25. Ions are further accelerated by a potential applied to acceleration electrode 40; the same potential is also applied to the first field-free drift tube (or space) 80. In this embodiment, the ion beam 85 passes through the first field-free drift tube 80 and is reflected by a first ion mirror 200 and a second ion mirror 210 and directed into a second field-free drift tube (or space) 82 also at the same potential as applied to the acceleration electrode 40. Ions pass through the second field free drift tube (or space) 82 and strike the front surface of a dual channel plate electron multiplier 90. An aperture 219 in the drift tube entrance plate 220 located at or near the exit of the second ion mirror 210 limits the energy dispersion in the ion beam 85 and filters off low energy ions resulting from fragmentation occurring between sample plate 10 and the drift tube entrance plate 220.

Figure 2:
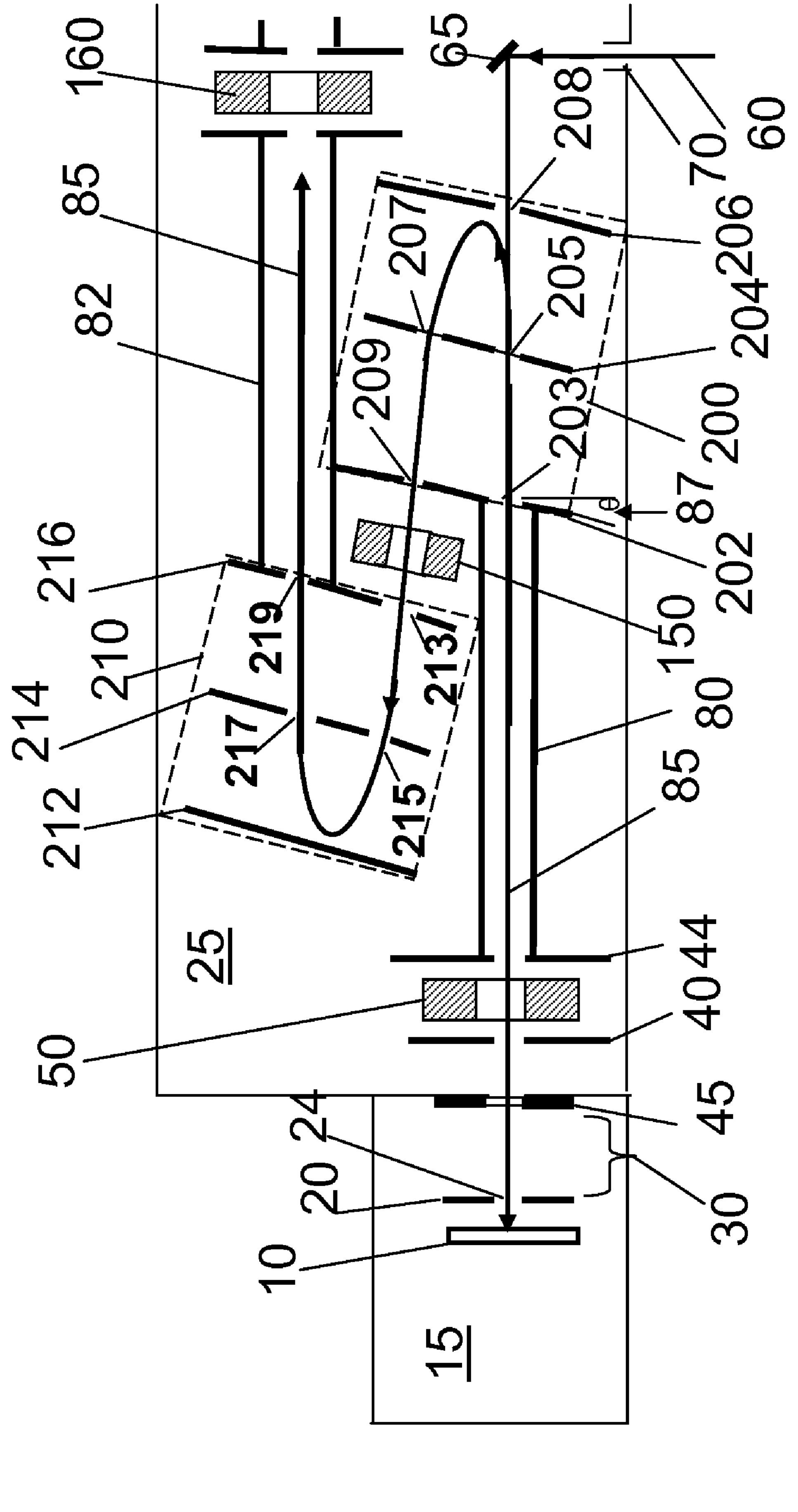
FIG. 2 is a schematic diagram of a portion of a reversed-geometry TOF mass spectrometer according to the present invention comprising a MALDI ion source and a pair of two-stage ion mirrors.

Referring now to FIG. 2, a schematic diagram of a portion of a reversed-geometry TOF mass spectrometer according to the present invention comprising a MALDI ion source and a pair of two-stage ion mirrors is shown. In one embodiment a first ion lens 50 located between the acceleration electrode 40 and entrance electrode 44 attached to the first field free drift tube (or space) 80 is energized to focus ions to a narrow beam entering the first ion mirror 200. The axis of the mirror is inclined at a small angle 87 relative the axis of the ion beam so that reflected ions are directed toward the entrance of second ion mirror 210. The angle 87 is always less than 90 degrees and more specifically is at least one degree but not more than 20 degrees. The second ion mirror 210 is aligned substantially parallel to the first ion mirror 200 so that ions exiting from the second ion mirror 210 are directed along the axis of the second field free drift tube (or space) 82 toward the detector. The axis of the second field free drift tube (or space) 82 is substantially parallel to the axis of the first field free drift tube (or space) 80. As used herein, "substantially parallel"

means a condition wherein two comparable points of each of the lines or planes defining the axes are within 1% of being the same distance apart.

In one embodiment, ion mirrors 200 and 210 (shown in outline in FIG. 2) comprise two-stage gridless mirrors. Drift tube electrodes 202 and 216 are connected to the same potential as first and second field free drift tubes 80 and 82, respectively. First mirror potential electrodes 204 and 214 are connected to first mirror potential $V_1$ and second mirror potential electrodes 206 and 212 are connected second mirror potential $V_2$. Aperture 208 in electrode 206 is covered with an open grid and is aligned with the pulsed laser beam 60. Apertures 203, 205, 207, and 209 in electrodes 202 and 204 of the first ion mirror 200 and apertures 213, 215, 217, and 219 in electrodes 216 and 214 of second ion mirror 210 are aligned with the nominal path of the ion beam through the mirror. Aperture diameters are chosen sufficiently large to allow a substantial fraction of the unfragmented ions to pass through the mirror. It is within the skill in the art to select an appropriate aperture size for the application. Ions that have lost significant energy due to fragmentation in flight follow a different path and are prevented from passing through the exit aperture 219 in the drift tube electrode 216.

In one embodiment a second ion lens 150 is located in the path between the exit aperture 209 of first ion mirror 200 and the entrance aperture 213 of second ion mirror 210. Lens 150 is energized to focus ions to compensate for focusing effects introduced by apertures 203, 205, 207, and 209 in mirror 200.

In one embodiment, a third ion lens 160 is located in close proximity to exit aperture 219 from the second ion mirror 210 to focus ions to compensate for focusing effects introduced by apertures 213, 215, 217, and 219 in mirror 210.

Figure 3:
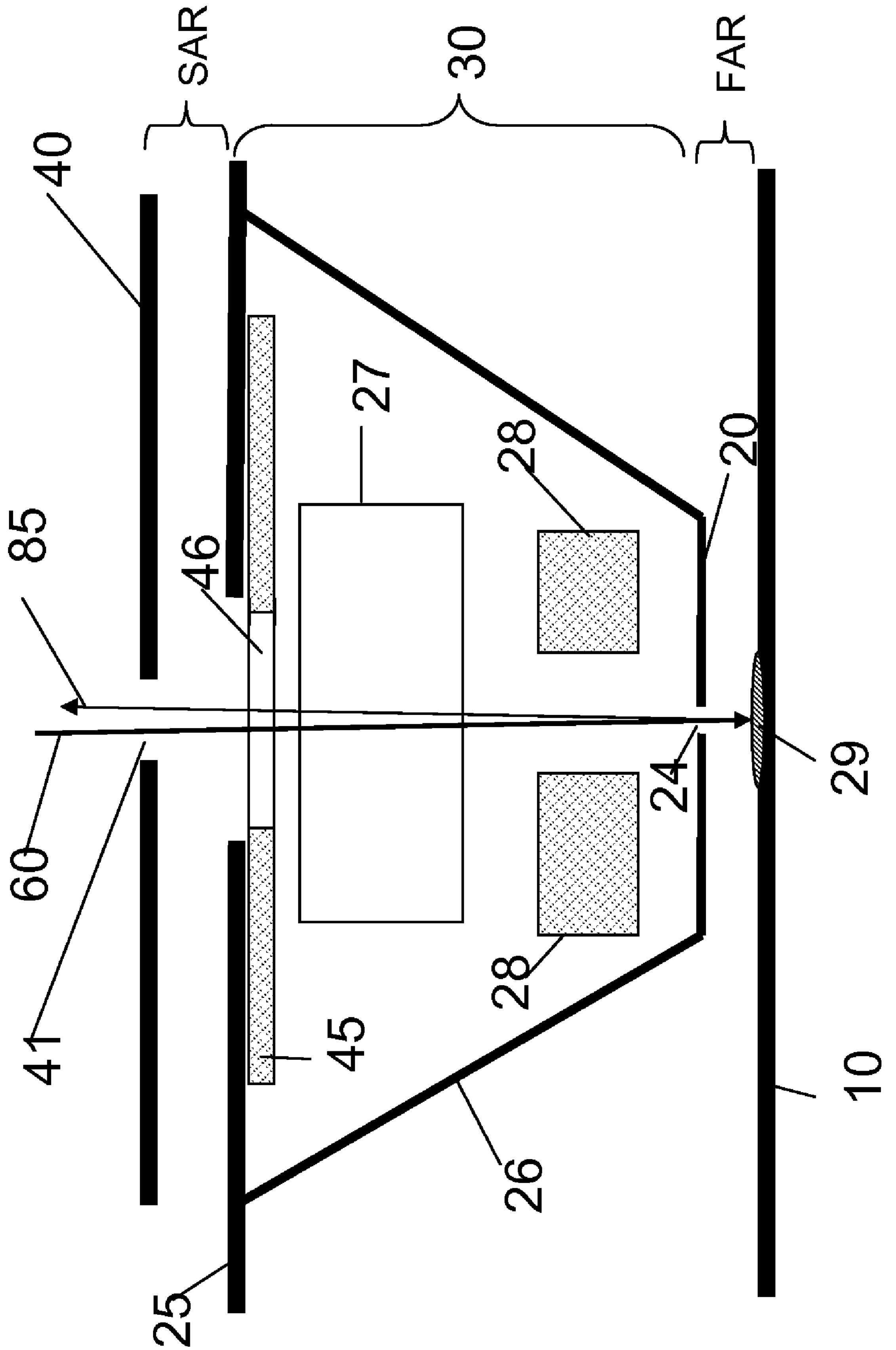
FIG. 3 is a schematic diagram of the ion source region of the analyzer according to the invention.

FIG. 3 shows a partial cross-sectional detail of one embodiment of the invention comprising the first accelerating region ("FAR") between the MALDI sample plate 10 and the grounded extraction electrode 20, the first field-free region between the extraction electrode 20 and the analyzer vacuum housing 25, and the second accelerating region ("SAR") between the analyzer vacuum housing 25 and acceleration electrode 40. In certain embodiments the first field-free region 30 is enclosed in a grounded shroud 26. Included within the field-free region are gate valve 45 and deflection electrodes 27 and 28. In the cross-sectional view deflection electrode 27 is below the plane of the drawing with a similar deflection electrode above the plane (not shown).

Voltage may be applied to one or more of the four deflection electrodes to deflect ions in the ion beam 85 produced by the pulsed laser beam 60 striking sample 29 deposited on the surface of the MALDI plate 10. A voltage difference between the paired deflection electrodes 27 deflects the ions in a direction perpendicular to the plane of the drawing, and a voltage difference between the pair of deflection electrodes 28 deflects ions in the plane of the drawing. Voltages can be applied as necessary to correct for misalignments in the ion optics and to direct ions along a preferred path to the detector.

Also, a time dependent voltage can be applied to one or more of the deflection electrodes to deflect ions within predetermined mass ranges so that they cannot reach the detector and to allow ions in other predetermined mass ranges to pass through undeflected.

Figure 4:
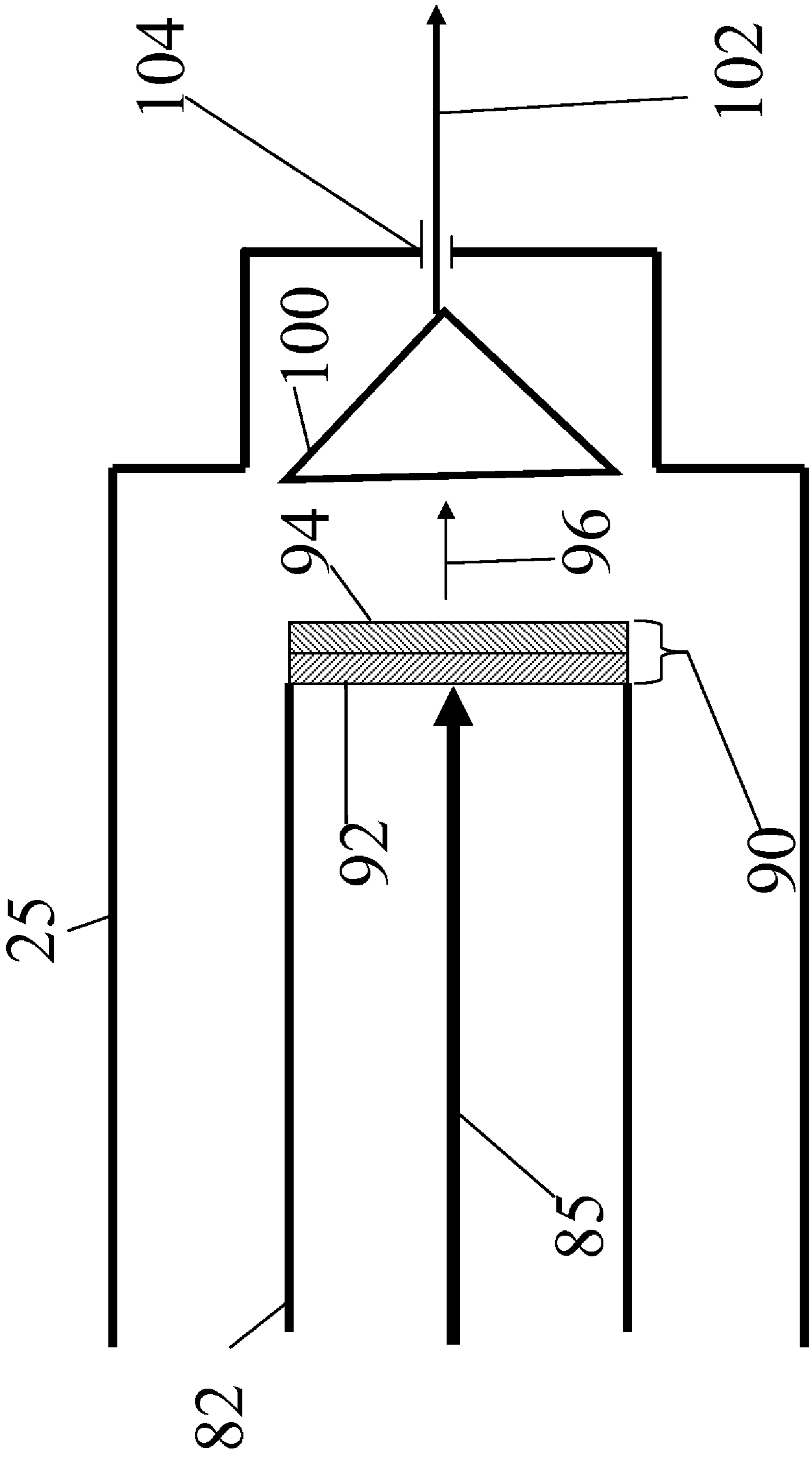
FIG. 4 is a schematic diagram of the detector region of the analyzer according to the present invention.

Referring now to FIG. 4, a schematic diagram of the detector region of the analyzer according to the present invention is shown. In operation, the ion beam 85 passes through the second field-free drift tube (or space) 82 and strikes the input surface 92 of the dual channel plate electron multiplier 90. Each ion impinging on the input surface 92 produces a large number (about 1 million) electrons in a narrow pulse 96 at the output surface 94 of the detector. The gain of the electron multiplier is determined by a bias voltage applied across the dual channel plate. The electrons are accelerated by the electric field between the output surface 94 and the anode 100 at ground potential, and strike the anode producing an electrical pulse that is coupled through an electrical feedthrough 104 in the wall of the analyzer vacuum housing 25 and connected to the input of a digitizer (not shown).

Figure 5:
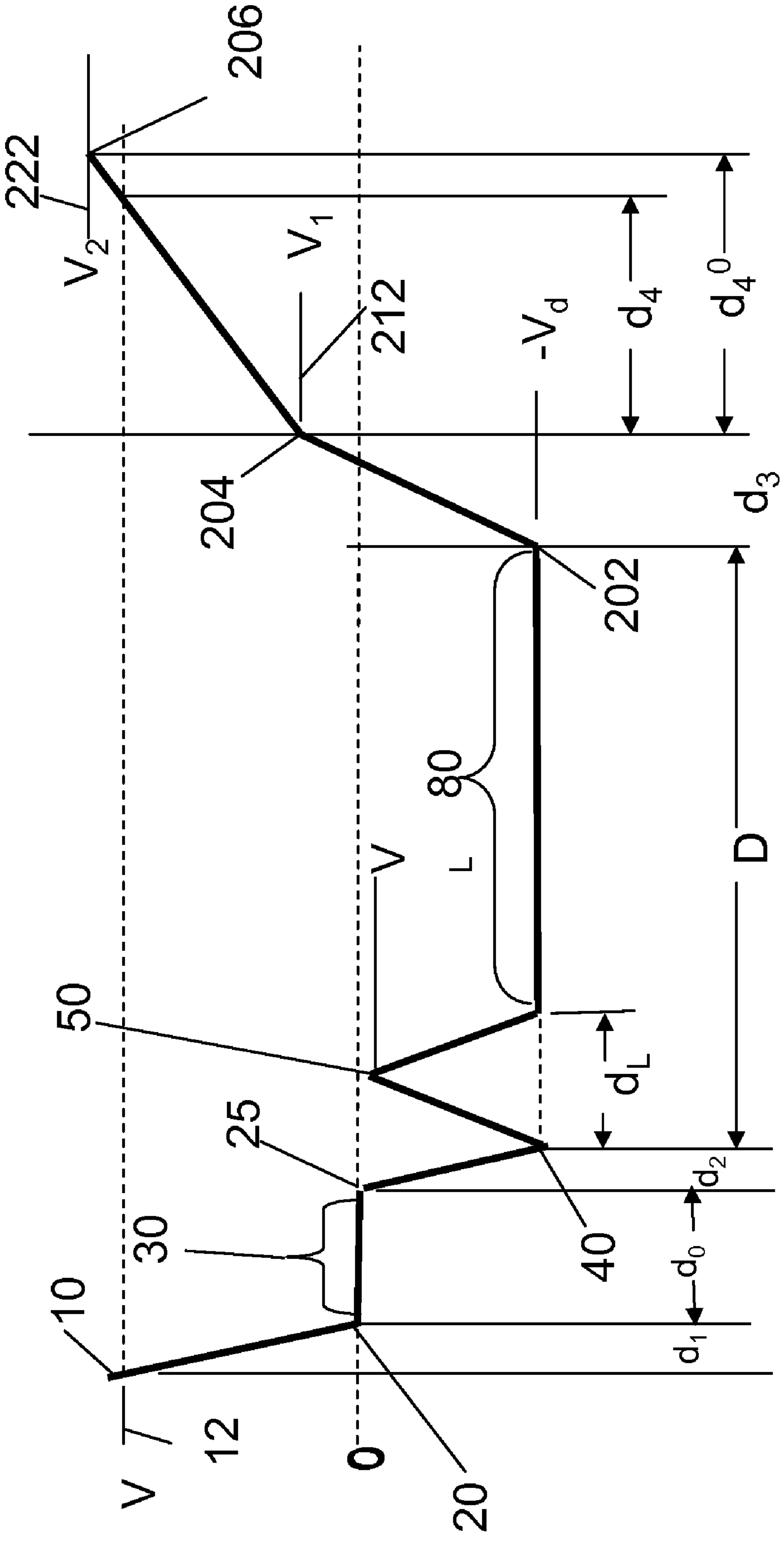
FIG. 5 is a potential diagram for a portion of the reversed-geometry reflecting time-of-flight analyzer according to the invention.

A potential diagram for a portion of the mass spectrometer according to the invention is shown in FIG. 5. A high voltage pulse of amplitude V is applied to the sample plate 10 at a time after a laser pulse strikes the surface of sample plate. Ions produced at the surface of sample plate are accelerated by the electrical field between sample plate and grounded extraction electrode 20. The pulse of ions passes through a first field-free space 30 at ground potential and are further accelerated by the electrical field between the analyzer vacuum housing 25 at ground potential and acceleration electrode 40 at potential $-V_d$ applied to acceleration electrode 40. Ions are focused by a first ion lens 50 energized by application of potential $V_L$, then pass through a first field-free drift tube (or space) 80, also biased at potential $-V_d$, and enter a first ion mirror 200. Electrode 204 is biased at potential $V_1$ and electrode 206 at potential $V_2$ to reflect ions toward a second ion mirror 210. Potential $V_1$ is also applied to electrode 214 and potential $V_2$ to electrode 212 in mirror 210. Potentials (not shown) similar, but not necessarily identical, to $V_L$ may also applied to second and third ion lenses 150 and 160.

The electrical fields between electrodes 204 and 202 and between 206 and 204 in mirror 200 should be substantially uniform but of different magnitudes as required for time focusing of the ion beam. Likewise, mirror 210 requires similar uniform electrical fields.

Figure 6:
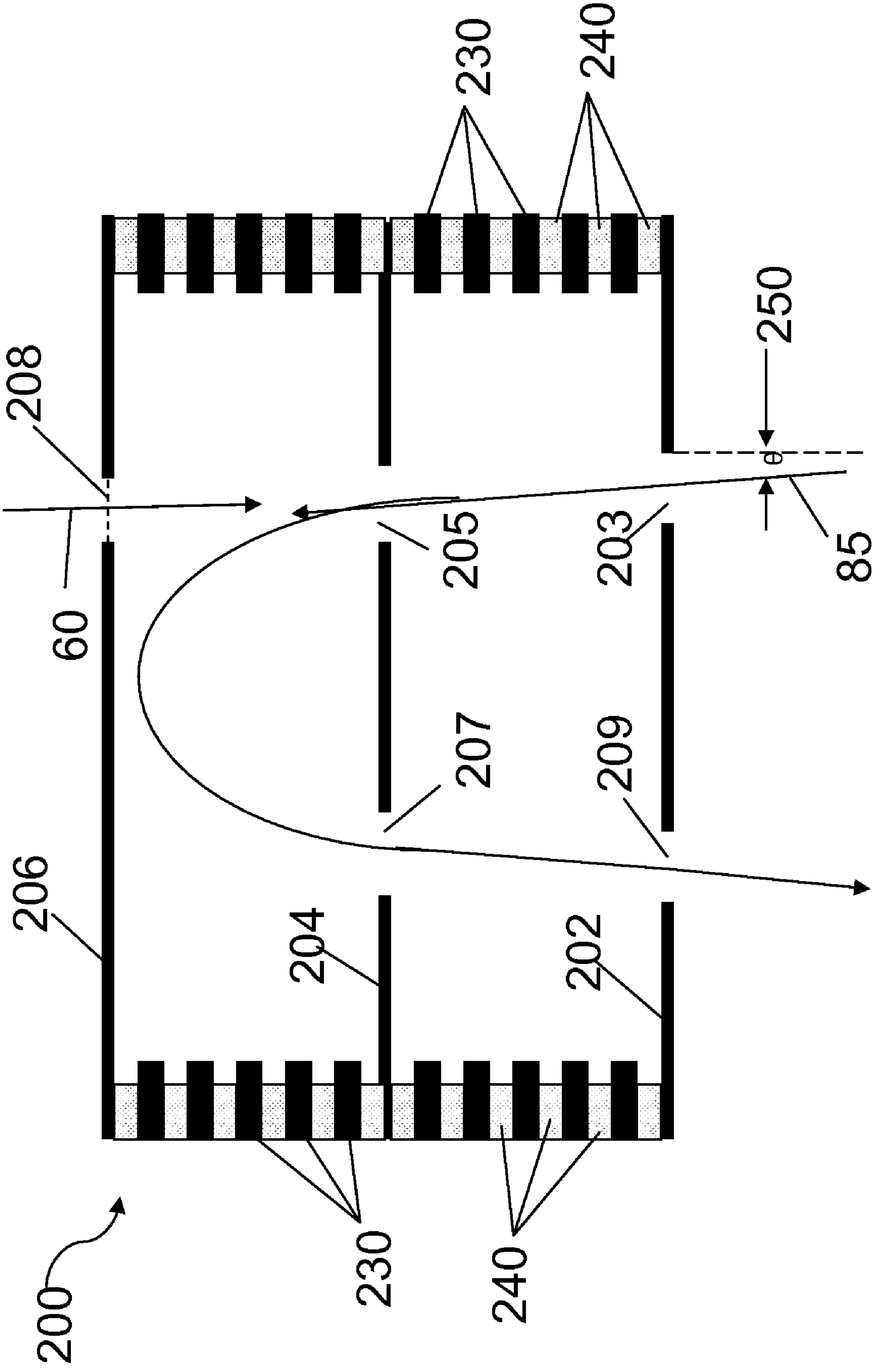
FIG. 6 is a representation of a two-stage gridless ion mirror according to one embodiment of the invention.

The arrangement employed to insure that the fields are substantially uniform in the region that the ion beam passes through is illustrated in FIG. 6. A stack of electrodes comprised of essentially identical electrodes 230, is formed with substantially identical insulating rings 240 interspersed between the electrodes. A resistive voltage divider consisting of a set of substantially identical resistors is connected between electrode 204 biased at potential $V_1$ and electrode 202 based at $-V_d$. The number of resistors in the divider is equal to the number of insulating rings located between electrodes 202 and 204, and each of the electrodes 230 in the stack is connected to the corresponding junction in the resistive voltage divider. A similar resistive voltage divider between electrode 206 at potential $V_2$ and electrode 204 biased at potential $V_1$ is connected to electrodes 230 located between electrodes 204 and 206. Similar voltage dividers are connected to electrodes 230 in mirror 210. In one embodiment a single voltage divider may be employed to provide intermediate potential to both mirror 200 and 210.

In one embodiment, the mirror dimensions and operating voltages are chosen so that the time required for ions to travel from a predetermined focal point in the first field free drift tube (or space) 80, be reflected by the two mirrors, and reach the detector is independent of the energy of the ions to both first and second order. First and second order focusing in a pair of reflectors requires satisfying the following equations:

$$8d_3/D_m=1-3/w \quad (1)$$

$$8d_4/D_m=w^{-3/2}+(8d_3/D_m)/(w+w^{1/2}) \quad (2)$$

where $D_m$ is the total length of the field-free ion path from the focal point to the mirror entrance 202 plus the path from the mirror exit 216 to the detector input surface 92, $d_3$ is the length of the first region of each mirror, $d_4$ is the distance than an ion with initial energy $V-V_d$ penetrates into the second region of each mirror and $w=(V-V_d)/(V-V_1)$ is the ratio of the ion energy at the entrance to the mirror to that at the entrance to the second region with the intermediate electrode at potential $V_1$. For the embodiment illustrated in FIG. 5 potential $V_d$ is of opposite polarity to potential V; thus the absolute value of the energy is $V-(-V_d)=V$ plus absolute value of $-V_d$. Thus, first and second order focusing can be achieved for any value of w>3, and the corresponding distance ratios are uniquely determined by equations (1) and (2). For predetermined values of $d_3$ and $D_m$, voltage $V_1$ applied to mirror 210 is adjusted to satisfy equation (1) and voltage $V_2$ applied to mirror 200 is adjusted to satisfy equation (2), where $$d_4=d_4^0(V-V_1)/(V_2-V_1) \quad (3)$$

In a preferred embodiment $V_d=-10$ kV, w=3.66, $(V_1-V_d)/(V-V_d)=0.7268$, $d_3=d_4^0=32$ mm, $(V_2-V_d)/(V-V_d)=1.008$, $d_4=31$ mm and the focal length $D_m=1420$ mm for first and second order focusing.

The effective length of each mirror is given by $$D_{em}=4d_4w^{1/2}+4d_3[w/(w-1)][1-w^{-1/2}]=321\text{ mm} \quad (4)$$

The first order mass dependent focal length of a single-stage ion source is given by $$D_1=2d_1y+(2d_1y)^2/v_n\Delta t \quad (5)$$

And the second order focal length is given by $$D_2=6d_1y \quad (6)$$

And these are satisfied simultaneously if $$v_n\Delta t=d_1y \quad (7)$$

If the energy is 20 kV and the focus mass is 6 kDa, this requires that Δt=236 nsec. The total effective flight distance is then $$D_e=1420+2(321)+36+12=2110 \quad (8)$$

And the effective length of the lenses are included in $D_m$.

The effective length, $D_e$, of a time-of-flight analyzer may be defined as the length of a field-free region for which the flight time of an ion with kinetic energy corresponding to that in the drift tube (or space) 80 is equal to that of the same ion in the real analyzer including accelerating and decelerating fields.

In one embodiment the effective length, $D_e$, is approximately 2100 mm and ion energy is 20 kV, corresponding to a high-voltage pulse 12 of 10 kV in amplitude applied to MALDI sample plate 10 and potential $V_d$ of −10 kV.

In this embodiment the flight time is approximately $$t=(2100/0.0139)(m/20)^{1/2}=33{,}800m^{1/2} \quad (9)$$

where t is in nsec and m in kDa. For a repetition rate of 5 khz the maximum flight time is 200,000 nsec thus the maximum mass is 35 kDa starting from mass zero. The low mass region is dominated by ions from the MALDI matrix that are generally not useful for the analysis of samples. Also, if ions of masses higher than 35 kDa are produced, these will arrive following the next laser pulse and will be recorded at an incorrect mass.

In one embodiment an ion gate is provided that limits the mass range of ions exiting the ion source following each laser pulse so that only ions within a select mass range are transmitted and detected.

First ion lens 50 together with acceleration electrode 40 and entrance electrode 44 at the entrance to drift tube (or space) 80 comprise an einzel lens that may be energized by applying voltage $V_L$ to ion lens 50. The effective length of the lens is given by $$D_{eL}=2d_LZ[1-(1-Z^{-1})^{1/2}]\text{ where }Z=(V-V_d)/(V_L-V_d) \quad (10)$$

In one embodiment Z=2, and $D_{eL}$ is approximately equal to 1.17 $d_2$. The effective length of the lenses are included in the field-free space between the exit from the source and the dual channel plate electron multiplier (i.e., detector) 90.

The time required for an ion to travel from the ion source to a deflection electrode following application of the high-voltage accelerating pulse to MALDI sample plate is essentially proportional to the square root of the mass-to-charge ratio, and this time can be calculated with sufficient accuracy from a knowledge of the applied voltage V and the distances involved. To transmit ions within a specified mass range, for example from $m_1$ to $m_2$, voltage is applied to the deflection electrode at or before the laser pulse occurs and continues until the time that $m_1$ arrives at the entrance to the deflection electrode, and is turned off until the time that $m_2$ exits the deflection electrode. After $m_2$ exits the deflection electrode, the voltage is turned back on. For example, mass ranges such as 0.5-44 kDa or 6-70 kDa can be acquired at 5 khz by using the mass gate to select a portion of the spectrum corresponding to arrival times at the detector within a 200 microsecond window corresponding to the time between laser pulses. Any ions outside the selected range are removed by the mass gate and the possibility of high masses overlapping into the spectrum produced by the next laser pulse is removed. The mass gate can also be employed to limit the mass range to a narrower window when required by the application.

The limit on resolving power set by time resolution is given by $$R_t^{-1}=t/2\delta t \quad (11)$$

Where δt is the uncertainty of the time measurement.

Design of TOF Analyzers

The principal measures of performance are sensitivity, mass accuracy, and resolving power. Sensitivity is the most difficult of these since it generally depends on a number of factors some of which are independent of the attributes of the analyzer. These include chemical noise associated with the matrix or impurities in the sample, and details of the sample preparation. For the purpose of assessing the performance of the analyzer independent of these extraneous (although often dominant) factors the major components of sensitivity are the efficiency with which sample molecules are converted to ions providing measurable peaks in the mass spectrum, and the ion noise associated with ions detected that provide no useful information. The efficiency may be further divided into ionization efficiency (ions produced/molecule desorbed), transmission efficiency, and detection efficiency. A very important term that is often ignored is the sampling efficiency (sample molecules desorbed/molecule loaded).

The major sources of ion loss and ion noise are fragmentation and scattering. Fragmentation can occur spontaneously at any point along the ion path as a result of excitation received in the ionization process. Fragmentation and scattering can also occur as the result of collisions of the ions with neutral molecules in the flight path or with electrodes and grids. A vacuum in the low $10^{-7}$ torr range is sufficient to effectively limit collisions with neutral molecules, but grids and defining apertures required to achieve resolving power in some cases may reduce sensitivity both due to ion loss and production of ion noise.

In a linear TOF system, fragmentation in the field-free region may produce some tails on the peaks, but generally has at most a small effect on sensitivity. The major loss and source of ion noise is fragmentation in the ion accelerator. If acceleration occurs between the end of the drift space and the detector, ghost peaks may occur as the result of low mass charged fragments arriving early and neutral fragments arriving late. No defining apertures or grids are required in the linear analyzer.

In reflecting analyzers, ions that fragment between the source and mirror will appear as broad peaks at an apparent mass below the peak for the precursor mass, since the fragments spend less time in the ion mirror. Ions fragmenting in the mirror are randomly distributed in the space between the parent ion and the fragment. Grids are often used in the mirror to improve resolving power; these may cause a significant loss in ion transmission and a source of ion noise.

In MALDI-TOF the most obvious limitation on resolving power and mass accuracy is set by the initial velocity distribution that is at least approximately independent of the mass and charge of the ions. Time lag focusing can be employed to reduce the effect of initial velocity, and the distribution in initial position of the ions may become the limiting factor. Other limits are imposed by trajectory errors and the uncertainty in the measurement of ion flight times.

Reversed Geometry Reflecting Analyzer

Referring now to FIG. 5. In one embodiment of FIG. 5, the critical distance parameters for the analyzer geometry are $d_1$=3 mm, $d_2$=3 mm, $d_0$=18 mm, $d_3$=32 mm, $d_4$=31 mm, $D_m$=1420, $D_{em}$=642. As used herein, "critical distance parameters" refer to the distances which combine in the manner illustrated in FIG. 5 or as described by the equations disclosed herein to produce the resulting length of the analyzer. These parameters include $d_1$, $d_2$, $d_0$, $d_3$, $d_4$, $d_4^0$, $D_m$, $D_{em}$ and D each of which is either identified in the figure or calculated using the equations disclosed herein.

In one embodiment $V=-V_d$, =10 kV thus $y=(V-V_d)/V=2$. In this case the total effective length is $$D_e = D_m + D_{em} + 6d_1y + 2d_1y = 1420+642+36+12=2110$$

The effective length of the ion lenses and the effective length of the grounded field-free region are included in $D_m$.

The various contributions to peak width in TOF MS can be summarized as follows: (expressed as Δm/m)

First order dependence on initial position $$R_{s1} = [(D_v - D_s)/D_e](\delta x/d_1y) \quad (12)$$

Where $D_e$ is the effective length of the analyzer, δx is the uncertainty in the initial position, $d_1$ is the length of the first region of the ion accelerator, and $D_v$ and $D_s$ are the focal lengths for velocity and space focusing, respectively, and are given by $$D_s = 2d_1y \quad (13)$$

$$D_v = D_s + (2d_1y)^2/(v_n^*\Delta t) = 6d_1y \quad (14)$$

Where Δt is the time lag between ion production and application of the accelerating field, and $v_n^*$ is the nominal final velocity of the ion of mass m* focused at $D_v$. $v_n^*$ is given by $$v_n^* = C_1(V/m^*)^{1/2} \quad (15)$$

The numerical constant $C_1$ is given by $$C_1 = (2z_0/m_0)^{1/2} = 2\times1.60219\times10^{-19}\ \text{coul}/1.66056\times10^{-27}\ \text{kg} = 1.38914\times10^4 \quad (16)$$

For V in volts and m in Da (or m/z) the velocity of an ion is given by $$v = C_1(V/m)^{1/2}\ \text{m/sec} \quad (17)$$

and all lengths are expressed in meters and times in seconds. It is numerically more convenient in many cases to express distances in mm and times in nanoseconds. In these cases $C_1=1.38914\times10^{-2}$.

The time of flight is measured relative to the time that the extraction pulse is applied to the source electrode. The extraction delay (time lag) Δt is the time between application of the laser pulse to the source and the extraction pulse. The measured flight time is relatively insensitive to the magnitude of the extraction delay, but jitter between the laser pulse and the extraction pulse causes a corresponding error in the velocity focus. In cases where Δt is small, this can be a significant contribution to the peak width. This contribution due to jitter δj is given by $$R_\Delta = 2(\delta_j/\Delta t)(\delta v_0/v_n^*)(D_v - D_s)/D_e = 2(\delta_j\delta v_0/D_e)[(D_v - D_s)/2d_0y]^2 \quad (18)$$

and is independent of mass.

With time lag focusing the first order dependence on initial velocity is given by $$R_m = [(4d_1y)/D_e](\delta v_0/v_n)[1-(m/m^*)^{1/2}] = R_{v1}[1-(m/m^*)^{1/2}] \quad (19)$$

Where $\delta v_0$ is the width of the velocity distribution. At the focus mass, m=m*, the first order term vanishes.

With first order focusing the velocity dependence becomes $$R_{v2} = 2[(2d_1y)/(D_v - D_s)]^2(\delta v_0/v_n)^2 \quad (20)$$

And with first and second order velocity focusing the velocity dependence becomes $$R_{v3} = 2[(2d_1y)/(D_v - D_s)]^3(\delta v_0/v_n)^3 \quad (21)$$

The dependence on the uncertainty in the time measurement δt is given by $$R_t = 2\delta t/t = (2\delta t C_1/D_e)(V/m)^{1/2} \quad (22)$$

The dependence on trajectory error δL is given by $$R_L = 2\delta L/D_e \quad (23)$$

A major contribution to δL is often the entrance into the channel plates of the detector. If the channels have diameter d and angle a relative to the beam, the mean value of δL is d/2 sin α. Thus this contribution is $$R_L = d/(D_e \sin\alpha) \quad (24)$$

Noise and ripple on the high voltage supplies can also contribute to peak width. This term is given by $$R_V = \Delta V/V \quad (25)$$

where ΔV is the variation in V in the frequency range that effects the ion flight time.

It is obvious from these equations that increasing the effective length of the analyzer increases the resolving power, but some of the other effects are less obvious. The total contribution to peak width due to velocity spread is given by $$R_v = R_m + (\Delta D_{12}/D_e)R_{v2} + [(D_e - \Delta D_{12})/D_e]R_{v3} \quad (26)$$

where $\Delta D_{12}$ is the absolute value of the difference between $D_{v1}$ and $D_{v2}$. Assuming that each of the other contributions to peak width is independent, the overall resolving power is given by $$R^{-1}=[R_\Delta^2+R_{s1}^2+R_v^2+R_t^2+R_L^2+R_V^2]^{-1/2} \quad (27)$$

Optimization of the Reversed Geometry Reflecting Analyzer

For a reflecting analyzer with first and second order focusing the terms limiting the maximum resolving power are $R_{s1}$, $R_{v3}$, and $R_t$. The variation of resolving power with mass is determined primarily by $R_{v1}$ and may also be affected by $R_t$. In terms of the dimensionless parameter $K=2d_1y/(D_v-D_s)$ the major contributions can be expressed as $$R_{s1}=2K^{-1}[\delta x/D_e] \quad (28)$$

$$R_{v3}=4K^3(\delta v_0/v_n)^3 \quad (29)$$

$$\text{And } R^2=4K^{-2}[\delta x/D_e]^2+16K^6(\delta v_0/v_n)^6 \quad (30)$$

The minimum value of $R^2$ corresponds to $d(R^2)dK=0$ $$-8K^{-3}[\delta x/D_e]^2+96K^5(\delta v_0/v_n)^6=0$$

$$K^8=(1/12)[\delta x/D_e]^2(\delta v_0/v_n)^{-6}$$

$$K=0.733\{[\delta x/D_e]/(\delta v_0/v_n)^3\}^{1/4} \quad (31)$$

For one embodiment $[\delta x/D_e]=0.01/21\ 10=4.74\times10^{-6}$, $(\delta v_0/v_n)^3=(0.0004/0.0254)^3=3.9\times10^{-6}$ K=0.77. For the embodiment described above K=0.5; very close to the optimum. In the more general case $$K=12^{-1/8}(De)^{-1/4}\{[\delta x C_1^3(\delta v_0)^{-3}\}^{1/4}(V/m^*)^{3/8}$$

In a preferred embodiment illustrated in FIG. 5, $d_1$=3 mm, $d_2$=3 mm, $d_0$=18 mm, $d_3$=32 mm, $d_4$=31 mm, $D_m$=1420, $D_{em}$=642. In one embodiment $V=-V_d$=10 kV thus $y=(V-V_d)/V=2$ and the total potential energy is 20 kV. In this case the total effective length is $$D_e=D_m+D_{em}+6d_1y+2d_1y=1420+642+36+12=2110 \quad (32)$$

These equations may be applied to calculating the resolving power as a function of m/z. In addition to the contributions to peak width due to $R_{s1}$ and $R_{v3}$, the other major contributor to peak width is due to uncertainty in the time measurement due to the finite width of single ion pulses and the width of the bins in the digitizer. Commercial detectors are now available that provide single ion peak widths less than 0.5 nsec and digitizers with 0.25 nsec bins are available. These allow the uncertainty, δt, in the time measurement to be reduced to about 0.75 nsec. With this value of δt the limit on peak width is $$\begin{aligned} R_t &= \Delta m/m \quad (33)\\ &= 2(\delta t)C_1V^{1/2}/(D_e m^{1/2})\\ &= 2(0.75)(.0139)(20^{1/2})/(2110[m]^{1/2})\\ &= 4.42\times10^{-5}/m^{1/2} \end{aligned}$$

Figure 7:
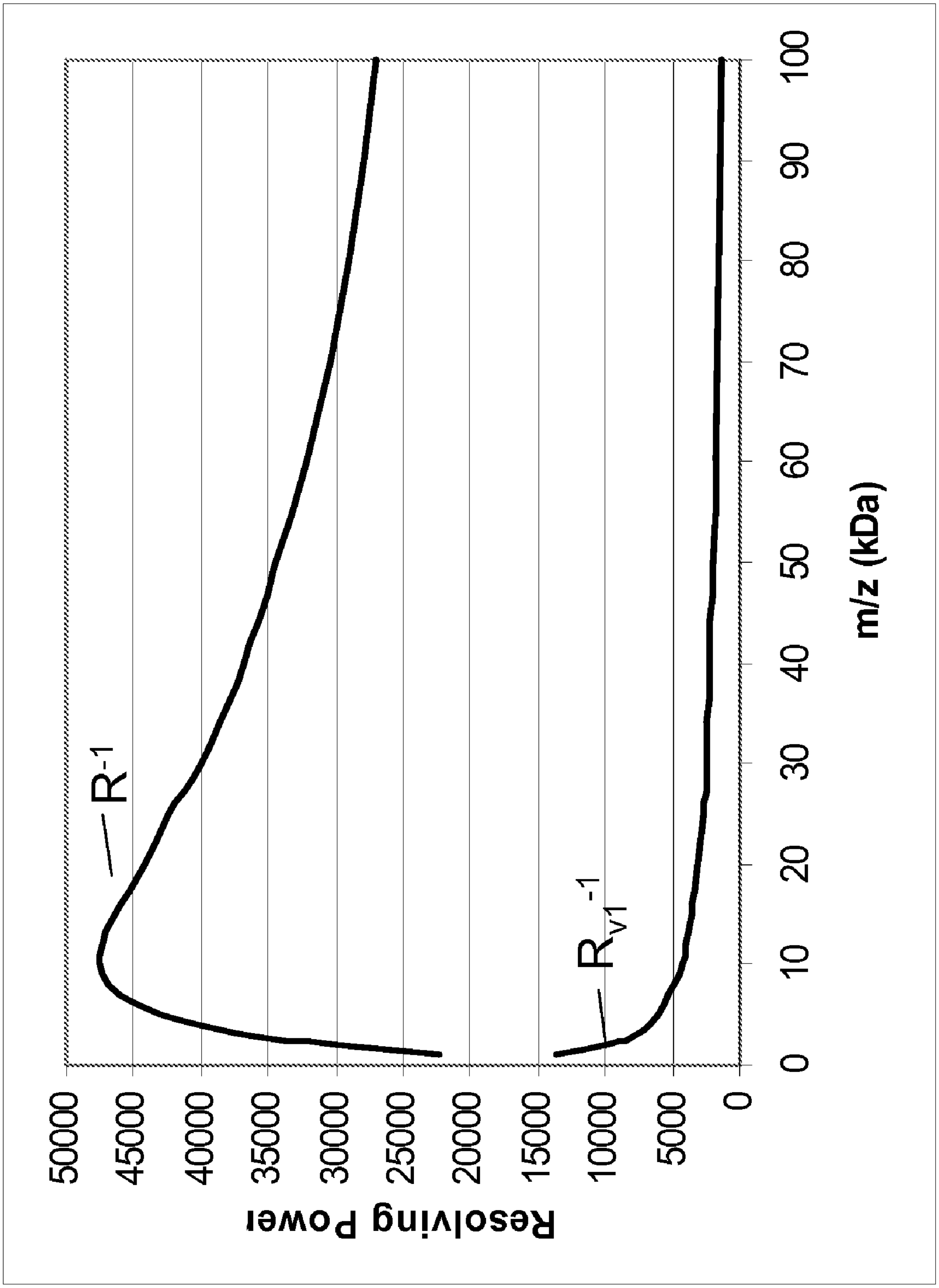
FIG. 7 is a plot of calculations of the maximum resolving for one embodiment of the invention as a function of the focus mass and the limit of resolving power at 4 times the focus mass as a function of focus mass.

Using the optimum value of K, and inserting $R_t$, $R_{s1}$, and $R_{v3}$ for each m* into equation (25) the maximum resolving power for at V=20 kV can be calculated as a function of the focus mass m*. Results over a broad range are illustrated in FIG. 7.

Figure 8:
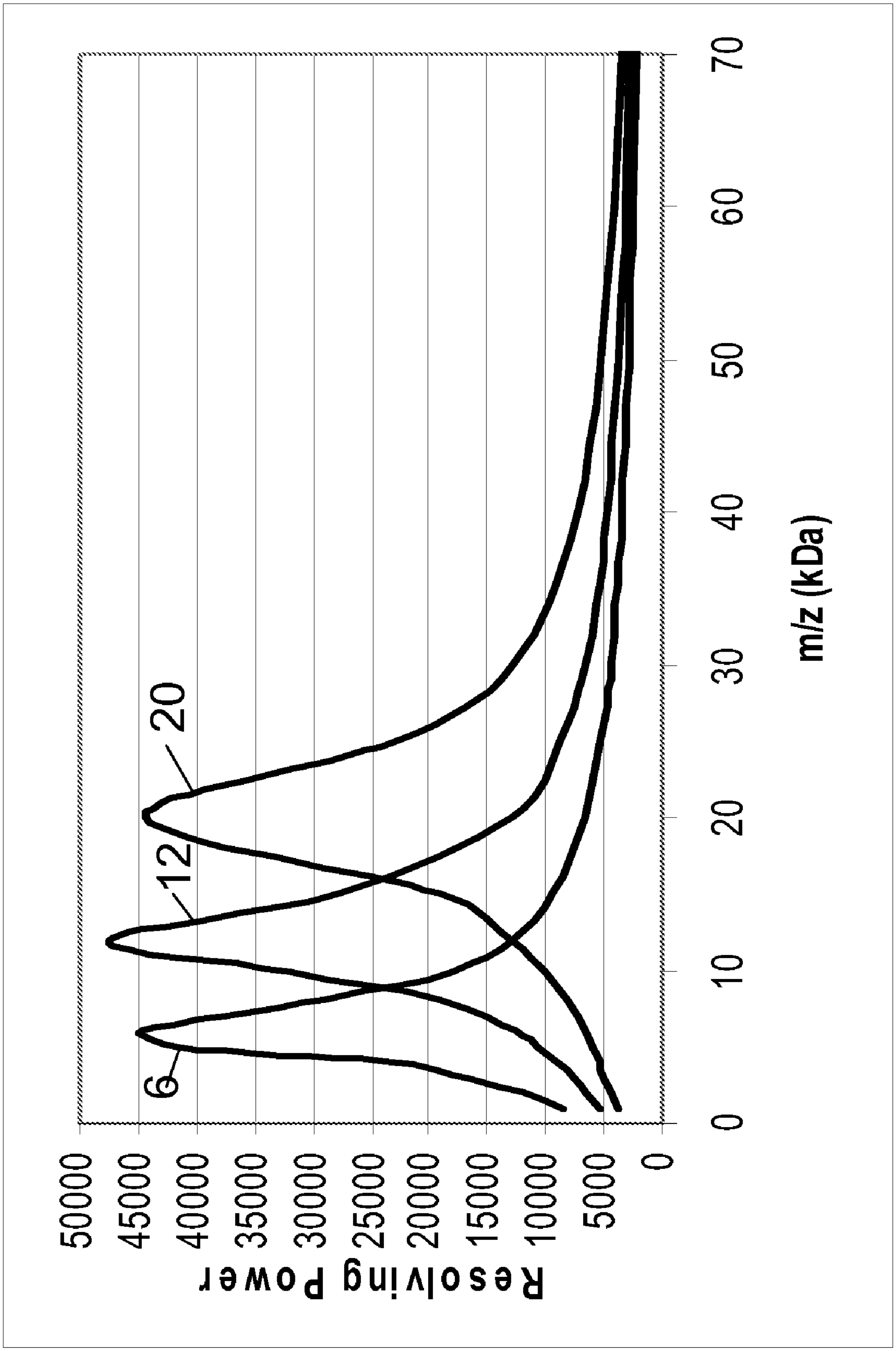
FIG. 8 is a plot of resolving power as a function of m/z for focus masses of 6, 12, and 20 kDa.

Increasing the length by a factor of 2 provides improvement in resolving power by about a factor of 1.8. Also plotted in FIG. 7 is the residual first order term $R_{v1}$ that determines the width of the resolving power curve at each m*. Calculated resolving power for m*=6, 12, and 20 kDa as functions of m/z are summarized in FIG. 8.

Simultaneous first and second order focusing with the single-field ion source occurs for K=0.5. For other value of K the first order focus is slightly longer or shorter than the second order focus. For example, with K=0.77, the focal lengths are $$D_{v1}=2d_1y+2.6d_1y=4.6d_1y \text{ and } D_{v2}=6d_1y \quad (34)$$

It is important to adjust the mirror potentials to achieve overall first order focusing, and the mirror can be adjusted to independently correct the second order focus. However, a small discrepancy in the second order focus is negligible so long as the error $\delta D/D_e$ is small compared to $\delta v_0/v_n$*. The first and second order focal lengths for a pair two-stage mirrors are given by $$D_{m1}=8d_4w^{3/2}+8d_3[w/(w-1)][1-w^{1/2}] \quad (35)$$

$$3D_{m2}=8d_4w^{5/2}+8d_3[w/(w-1)][1-w^{3/2}] \quad (36)$$

Equations (1) and (2) are derived by setting these focal distances equal, but these can be varied independently, for example by adjusting $d_4$ by changing $V_2$ according to equation (3).

The equations presented here provide the theoretical background for methods to design and optimize reflecting analyzers for generating spectra with high resolution and mass accuracy. The emphasis is on application to MALDI, but the techniques described can be applied to any TOF mass spectrometer. If the initial conditions including the initial velocity spread $\delta v_0$, and initial position uncertainty δx are known or can be accurately estimated, and if the measurement uncertainty δt and the jitter in the delay δj are known, then for any size analyzer the optimum time lag Δt, the optimum mirror voltages, and optimum acceleration voltage can be determined accurately for any specified focus mass. Furthermore, the maximum resolving power possible can be accurately determined. Alternatively for any specified resolving power required the minimum analyzer size and optimum acceleration voltage can be determined.

Calibration for Accurate Mass Determination

With first and second order focusing the flight time is proportional to the square root of the mass except for the time spent in the ion source that depends on the initial velocity. Thus the total flight time for one embodiment is given by $$t-t_0=(D_e/v_n)[1-2d_1yv_0/(D_ev_n)]=Am^{1/2}[1-Bm^{1/2}]=X \quad (37)$$

where $t_0$ is the offset between the extraction pulse and the start time of the digitizer, and the default values of the constants are $$A=D_e/CV^{1/2}B=(2d_1y/D_e)(v_0/CV^{1/2}) \quad (38)$$

This equation can be inverted using the quadratic formula to give an explicit expression for mass as a function of flight time.

$$m^{1/2}=(2B)^{-1}[1-(1-4BX/A)^{1/2}] \quad (39)$$

Higher order terms may become important if a very wide mass range is employed. A higher order correction can be determined by the following procedure.

$$Z(m)=[(t-t_0)/\{Am^{1/2}(1-Bm^{1/2})\}]=1-C(m-m_0) \quad (40)$$

If a significant systematic variation of Z with m is observed, then the results are fitted to an explicit function, such as given in equation (40). This factor Z(m) is then applied to the value of $m^{1/2}$ from equation (39) to determine the accurate mass. The value determined from equation (39) is divided by Z(m).

The values of $t_0$, A, and B are determined by least squares fit from three or more peaks to equation (1). If a systematic variation of Z is observed, then the higher order term may be important, and the offset $m_0$ may be necessary to compensate for the systematic error in the calibration.

While this invention has been particularly shown and described with references to preferred embodiments thereof, it will be understood by those skilled in the art that various changes in form and details may be made therein without departing from the scope of the invention encompassed by the appended claims.

What is claimed is:

1. A time-of-flight mass spectrometer comprising:

a. a pulsed ion source;

b. a first field-free drift space positioned to receive ions from the pulsed ion source;

c. a first ion mirror which receives ions from the first field-free drift space, wherein the longitudinal axis of said first ion mirror is inclined at a predetermined angle relative to the longitudinal axis of the first field-free drift;

d. a second ion mirror which receives ions reflected by said first ion mirror, said second ion mirror having a longitudinal axis substantially parallel to the longitudinal axis of the first ion;

e. a second field-free drift space positioned to receive ions reflected by the second ion mirror; and f. an ion detector having an input surface in electrical contact with the second field field-free drift space at the end distal from the second ion mirror.

2. The time-of-flight mass spectrometer of claim 1 wherein the longitudinal axis of the second field-free drift space is substantially parallel to the longitudinal axis of the first field-free drift space.

3. The time-of-flight mass spectrometer of claim 2 wherein the longitudinal axis of the second field-free drift space is displaced latterly from the longitudinal axis of the first field-free drift space and the longitudinal axis of the second ion mirror is displaced latterly in the same direction from the longitudinal axis of the first ion mirror and wherein the displacement between the longitudinal axes of the field-free spaces is about twice the displacement between the longitudinal axes of the ion mirrors.

4. The time-of-flight mass spectrometer of claim 1 wherein the first and second ion mirrors are substantially identical.

5. The time-of-flight mass spectrometer of claim 4 wherein each of said first and said second ion mirrors are two-stage ion mirrors.

6. The time-of-flight mass spectrometer of claim 5 wherein each of the two-stage ion mirrors comprises two substantially uniform fields and wherein the field boundaries are defined by grids that are substantially parallel.

7. The time-of-flight mass spectrometer of claim 6 wherein each of the two-stage ion mirrors comprises two substantially uniform fields and wherein the field boundaries are defined by substantially parallel conducting diaphragms with small apertures, said apertures aligned with incident and reflected ion beams.

8. The time-of-flight mass spectrometer of claim 6 wherein the electrical field strength in the first stage of the two-stage ion mirrors adjacent to a field-free drift space which is greater than the electrical field strength in the second stage of the two-stage ion mirrors.

9. The time-of-flight mass spectrometer of claim 6 wherein the electrical field strength in the first stage of the two-stage ion mirrors adjacent to the field-free drift space is at least twice but not more than four times greater than the electrical field strength in the second stage of the two-stage ion mirrors.

10. The time-of-flight mass spectrometer of claim 1 wherein the length of the second field-free drift space is more than three times the length of the first field-free drift space.

11. The time-of-flight mass spectrometer of claim 1 wherein more than half of the total ion flight time between the pulsed ion source and the ion detector occurs in the second field-free drift space.

12. A time-of-flight mass spectrometer comprising:

a. an ion source vacuum housing configured to receive a MALDI sample plate;

b. a pulsed ion source located within the evacuation ion source housing;

c. an analyzer vacuum housing;

d. a gate valve located between and operably connecting said ion source vacuum housing and said analyzer vacuum housing and maintained at or near ground potential;

e. a first field-free drift tube located within said analyzer vacuum housing but electrically isolated from said housing to receive an ion beam from said pulsed ion source;

f. a first two-stage gridless ion mirror to receive ions from said first field-free drift tube;

g. a second two-stage gridless ion mirror to receive ions from said first ion mirror;

h. a second field-free drift tube located within said analyzer vacuum housing but electrically isolated from said housing to receive an ion beam from said second two-stage gridless ion mirror; and i. an ion detector having an input surface in electrical contact with the second field field-free drift tube at the end distal from the second two-stage gridless ion mirror.

13. The time-of-flight mass spectrometer of claim 12 further comprising:

a. an aperture in the back of the first ion mirror substantially aligned with an aperture in the gate valve; and b. a pulsed laser laser beam directed through the apertures in (h) to strike the MALDI sample plate and produce a pulse of ions.

14. The time-of-flight mass spectrometer of claim 13 further comprising:

a. a high voltage pulse generator operably connected to the MALDI sample plate within the source vacuum housing;

b. a time delay generator providing a predetermined time delay between an ion pulse and a high voltage pulse;

c. a first high voltage supply providing substantially constant voltage to the first and second field-free drift tubes of opposite polarity to that of the high voltage pulse generator;

d. a second high voltage supply providing substantially constant voltage to an electrode separating the first and second stages of the two-stage ion mirrors wherein the same voltage is applied to both mirrors; and e. a third high voltage supply providing substantially constant voltage to an electrode terminating the second stage of the two-stage ion mirrors wherein the same voltage is applied to both mirrors and the magnitude of this voltage is of the same polarity and greater in magnitude by a predetermined amount relative to the amplitude of the high voltage pulse referenced to ground potential.

15. The time-of-flight mass spectrometer of claim 14 wherein the predetermined time delay comprises an uncertainty of not more than 1 nanosecond.

16. The time-of-flight mass spectrometer of claim 12 further comprising one or more pairs of deflection electrodes located in a field-free region at ground potential adjacent to the gate valve with any pair energized to deflect ions in either of two orthogonal directions.

17. The time-of-flight mass spectrometer of claim 16 wherein at least one of the deflection electrodes of any pair of deflection electrodes is energized by a time-dependent voltage resulting in the deflection of ions in one or more selected mass ranges.

18. The time-of-flight mass spectrometer of claim 16 further comprising one or more ion lenses for spatially focusing an ion beam.

19. The time-of-flight mass spectrometer of claim 18 wherein said one or more ion lenses comprise:

a. a first ion lens located between the pulsed ion source and the gate valve b. a second ion lens located between the gate valve and the first field-free drift tube;

c. a third ion lens located between the first and second two-stage gridless ion mirrors; and d. a fourth ion lens located in close proximity to the exit of the second two-stage gridless ion mirror; a first field-free drift tube located within said analyzer vacuum housing but electrically isolated from said housing to receive an ion beam from said pulsed ion source.

20. The time-of-flight mass spectrometer of claim 1 wherein the pulsed ion source operates at a frequency of 5 khz.

21. A method for designing a MALDI-TOF mass spectrometer comprising the steps of:

a. determining or estimating the uncertainties in the initial velocity and position of the ions produced in the ion source;

b. calculating values for the critical distance parameters defining the analyzer geometry;

c. calculating the optimum time lag between laser pulse and high-voltage extraction pulse as a function of focus mass;

d. calculating the optimum accelerating voltages and mirror voltages as functions of focus mass; and e. calculating the theoretical resolving power as a function of m/z, wherein the results of steps (a)-(e) taken together provide the measurements of the MALDI-TOF mass spectrometer having predetermined limits on overall size and uncertainty in the time measurement.

22. A method for designing a high-resolution MALDI-TOF mass spectrometer comprising the steps of:

a. calculating the minimum overall length and values for the critical distance parameters defining the analyzer geometry;

b. calculating the optimum accelerating voltages and mirror voltages; and c. calculating the optimum time lag between laser pulse and high-voltage extraction pulse, wherein the results of the foregoing steps taken together provide the measurements for a high-resolution MALDI-TOF mass spectrometer capable of achieving a specified resolving power at a specified mass with specified values of the uncertainties in the initial velocity and position of ions produced in the ion source and the uncertainty in the time measurement.

* * * * *